United States Patent [19]

Tripp

[11] 3,757,321

[45] Sept. 4, 1973

[54] TRANSDUCER DRIVE APPARATUS AND METHOD

[75] Inventor: Robert W. Tripp, Tuckahoe, N.Y.

[73] Assignee: Inductosyn Corporation, Valhalla, N.Y.

[22] Filed: Dec. 27, 1971

[21] Appl. No.: 225,729

[52] U.S. Cl. ...................... 340/347 AD, 340/347 SY

[51] Int. Cl. ............................................ H03k 13/02

[58] Field of Search .................. 328/57, 18; 307/81, 307/57, 127; 323/58; 317/7; 235/92 PB; 340/347 AD

[56] References Cited

UNITED STATES PATENTS

| | | | |
|---|---|---|---|
| 3,458,727 | 7/1969 | Watkins | 307/127 |
| 3,497,796 | 2/1970 | Konrad | 307/127 |
| 3,175,138 | 3/1965 | Kilroy | 340/347 DA |
| 3,258,667 | 6/1966 | McDonough | 340/347 DA |

*Primary Examiner*—Thomas A. Robinson
*Assistant Examiner*—Jeremiah Glassman
*Attorney*—William E. Beatty

[57] ABSTRACT

Disclosed is a power drive circuit for driving loads such as the sine and cosine windings of a position-measuring transformer. The windings of the transformer are driven bilaterally by converter-controlled drive circuits with substantially constant magnitude currents in both directions for selected durations to produce pulse-width modulated signals. Unwanted signals due to undesired cross coupling between sine and cosine windings are avoided by providing a constant power drain from the power source which is connected in common to all of the drive circuits. To avoid the presence of undesired even harmonic signal components, the load is supplied with a bilateral current which is symmetrical over each cycle.

10 Claims, 7 Drawing Figures

INVENTOR.
ROBERT W. TRIPP
BY David E. Lovejoy
W. E. Beatty
ATTORNEYS

TRANSDUCER DRIVE APPARATUS AND METHOD

CROSS REFERENCE TO RELATED APPLICATIONS

1. SCALE OF 2 IMPROVED DIGITAL AND ANALOG CONVERTER, Ser. No. 112,994, filed Feb. 5, 1971, invented by Robert W. Tripp, assigned to Inductosyn Corporation.
2. TRIGONOMETRIC SIGNAL GENERATOR AND MACHINE CONTROL, Ser. No. 864,079, filed Oct. 6, 1969, invented by Robert W. Tripp, assigned to Inductosyn Corporation.

BACKGROUND OF THE INVENTION

The present invention relates to the field of digital and analog converters and, particularly, to converters and drive circuits employed for accepting digital inputs and responsively providing signals, of the pulse-width modulation type, to position-measuring devices.

One typical converter for use with position-measuring devices is described in the above-referenced application Ser. No. 112,994. In that application, a digital and analog converter is disclosed which accumulates a digital value "*n*", stored as a running count difference between the counts in two cyclically stepped counters, and responsively forms pulse-width modulated output signals. The output signals drive, that is, energize, a position-measuring device. Position-measuring devices of the type described are frequently marketed under the registered trademark Inductosyn. Such devices are transformers having sine and cosine windings on one member and a continuous scale winding on the other member.

Position-measuring transformers typically operate over one or more discrete space cycles, for example, 0.1 inch or 1 mm. for linear devices or 1° for rotary devices. To obtain further resolution, each space cycle is divided into a number, N, of parts, where N typically is 2000 or 10,000. The digital value "*n*" identifies a particular one of the space positions between O and N over one space cycle. The value of "n" is stored in a converter, as discussed above. The pulse-width modulated signals output from the converter are applied through a drive circuit to the transformer windings and have pulse widths which are a function of the ratio "n"/N.

In order to obtain higher accuracies and to obtain greater divisions of transducer cycles, that is, make N larger, or in order to otherwise obtain improved operation, the pulsewidth modulated signals must be properly formed to avoid unwanted, erroneous signals.

Erroneous signals in analog and digital conversions of the above type can occur for a number of reasons. One reason is due to the cross coupling of the signal supplied to the sine winding into the signal supplied to the cosine winding, and vice versa. Cross coupling can occur, for example, through the power supply if the power supply is connected in common to the drive circuits which energize both the sine and cosine windings. A common connection to the drive circuits is desired in order to assure that the sine and cosine windings have signals based upon the same reference amplitude. In some prior art devices, the power output of the power supply has undesirably varied as a function of the pulse-width modulated information signal. This unwanted power supply variation occurs, for example, when a change in power in the output to the sine winding, for changing the sine information signal, also introduces a small change in output power to the cosine winding, and vice versa. Such cross modulations due to variations in the power supply can, in some instances, interfere with the desired operation and are, therefore, undesirable.

Other forms of unwanted signals occur in the position-measuring transducer systems as a result of the frequency characteristics of the signals which drive the sine and cosine windings. For example, position-measuring transformers receive pulse-width modulated rectangular wave drive signals of a given fundamental frequency, F, and responsively develop an output error signal also of frequency F. The output error signal is a function of both the drive signals and the relative space position of the relatively movable members of the position-measuring transformer. The signal components in the error signal at frequencies other than F can cause errors. Of particular problem are second harmonic signal components, that is, signals at a frequency 2F.

In systems like that described in the above-referenced Ser. No. 112,994 application, the pulse-width modulated signals applied to drive the sine and cosine windings of the transducer contain the second harmonic, 2F, as well as all other higher order harmonics. The pulse-width modulation in that apparatus is achieved by unilateral conduction through the loads, that is, through the sine and cosine windings. The duration of conduction controls the pulse width. With unilateral conduction, power is drawn from the power source only during the conduction period. Accordingly, the power output of the power source varies as a function of the pulsewidth modulation. When both sine and cosine windings are supplied by a common power source, an undesired cross modulation can occur. Further, the unilateral drive necessitates that the pulse-width modulated waveform will at times be asymmetrical and therefore contain even harmonics of the fundamental frequency. Although these higher-order harmonics can be removed in part from the error signal output from the scale winding by well known phase detection and filtering techniques, it is still desirable to reduce the magnitude of higher-order harmonics from the drive signals in order to help eliminate deleterious higher-order harmonics in the error signal.

In accordance with the above background of the invention, it is an object of the present invention to provide an improved drive circuit for driving position-measuring devices which has an improved operation, and has fewer unwanted signals.

SUMMARY OF THE INVENTION

The present invention is a transducer drive apparatus for applying information modulated, rectangular wave signals to a load such as a position-measuring transformer. Unwanted error-causing signals are eliminated or reduced by employing a bilateral drive current in the load where that drive current is produced by the operation of a plurality of bistate drive circuits. The drive circuits are energized by a power source and are logically controlled by the phase-shifted control signals produced in a digital and analog converter. The digital and analog converter typically includes two counters cyclically stepped over a range representing a value N for storing, as a count difference, a representation of a digital value "*n*". The output signals from the counters have a phase shift proportional to "*n*"/N.

In a first or asymmetrical embodiment of the present invention, first and second bistate drive circuits, energized by a common power source, are connected respectively at opposite ends of a load. The load is typically the sine or cosine winding of a position-measuring transformer. Logic gates responsive to the phase-shifted control signals of the converter maintain the two drive circuits in first or in second opposite states whereby a substantially constant magnitude current is continually drawn from the power source and supplied to the load. A change from first opposite states to second opposite states of the drive circuits changes the direction of current in the load, without altering the current or power supplied to the load. The resultant current drive signal in the load has a pulse-width modulated rectangular waveform where the modulation is controlled by controlling the time at which the drive circuits change back and forth between the first and second opposite states. In an embodiment of the present invention where two loads comprising sine and cosine windings each has pairs of drive circuits energized by a common power source, the sine winding and the cosine winding in accordance with the first embodiment of the invention each draws constant power from the power source so that no cross modulation between sine and cosine windings occurs.

In a second or symmetrical embodiment of the present invention, each terminal of a two-terminal sine or cosine load is again connected to the power source through a bistate drive circuit. Additionally, logical means cause the durations of conduction through the load in each direction to be of equal duration and of symmetrical distribution over each cycle. The result is a symmetrical bilateral drive through the load which includes only the fundamental and odd harmonics without any even harmonics. With the absence of the second harmonic and higher order even harmonics, the filtering and phase detection requirements are relaxed and thereby improved operation is assured.

In a further embodiment of the invention, the above symmetrical bilateral embodiment additionally includes secondary loads in addition to the principal sine and cosine loads. An additional bistate drive circuit is employed for each secondary load. The additional drive circuit is logically controlled to conduct current from the power source whenever the principal load is not conducting. In this manner, a constant power drain is presented to the power source by the combination of the principal and alternate loads. Accordingly, the information modulation, typically pulsewidth modulation, in the sine and cosine windings does not result in a variation of the power output from the power source, and hence, no unwanted signals are introduced into the principal load.

DETAILED DESCRIPTION

Figure 1:
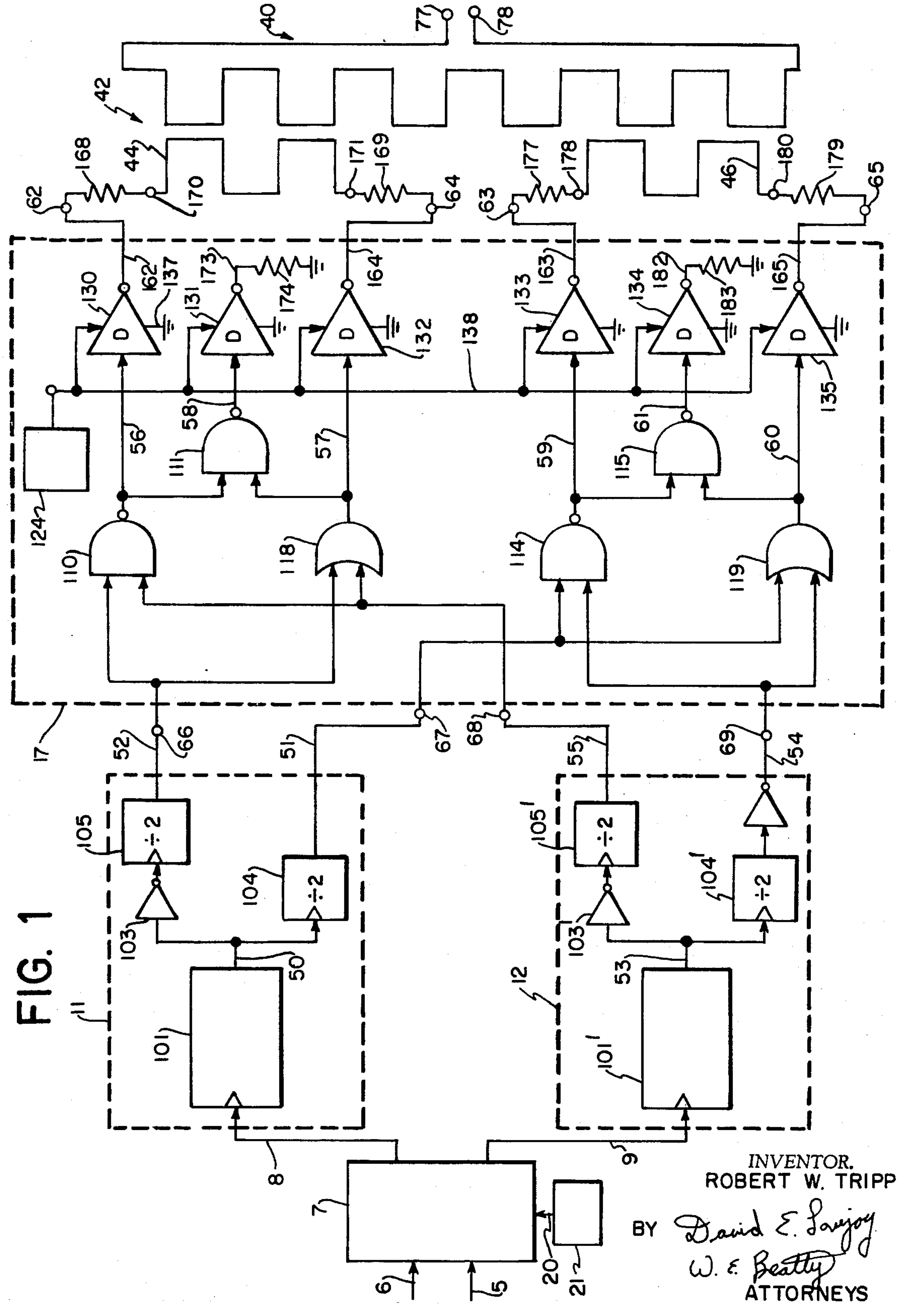
FIG. 1 depicts an electrical, schematic representation of a digital and analog converter driving a position-measuring transformer with a drive circuit in accordance with the present invention.

Referring to FIG. 1, a position-measuring transformer 42 is driven by a logical combining and power drive means 17. The power drive means 17, together with a first counter 11 and a second counter 12, and a control and generation means 7 from a digital and analog converter for driving the position-measuring transformer 42.

In FIG. 1, the general function and operation of the control and generation means 7, the first and second counters 11 and 12, the logical combining and power drive means 17 are analogous to the like-numbered elements of the above-identified application Ser. No. 112,994. Therefore, that application Ser. No. 112,994 is hereby incorporated in this application for the purpose of teaching the general operation of a digital and analog converter in combination with a position-measuring tansformer.

Briefly, the position-measuring transformer 42 includes a scale winding 40 inductively related to polyphase windings consisting of cosine winding 44 and sine winding 46. Windings 44 and 46 are located on one member (not shown) and are in space quadrature of the pole cycle of the scale winding 40 on another member (not shown). The windings 44 and 46 are relatively movable with respect to the scale winding 40.

The energization of the sine winding 46 and the cosine winding 44 with pulse-width modulated drive signals each having a fundamental frequency component having an amplitude proportional to the sine and cosine of the same electrical angle $\theta$ results in an information signal, called the error signal, in the scale winding 40.

The error signal has zero amplitude when the position defined by the sine and cosine windings 46 and 44 correlates with the actual relative space position of those windings to the scale winding 40. When they do not correlate, the amplitude of the error signal changes as a function of the displacement from the zero amplitude position.

The error signal in scale winding 40, between output terminals 77 and 78, includes a fundamental frequency component proportional to the sine and cosine drive signals in the windings 44 and 46, respectively, and to the relative space position of the winding 40 relative to the windings 44 and 46.

The control and generation means 7 is connected by line 20 to a clock 21. Clock 21 provides a series of high frequency stepping pulses to the control and generation means 7 for producing stepping pulses on lines 8 and 9 connected as inputs to counter stages 101 and 101', respectively, of the first and second counters 11 and 12, respectively.

In the absence of any input pulses on line 6, an equal number of the stepping pulses on lines 8 and 9, as derived from clock 21, are applied to counters 11 and 12. Each input pulse on line 6, called RCT pulses, causes a change between the number of pulses on the line 8 with respect to the number on line 9. The relative change can occur in either direction, that is, more pulses on line 8 than on line 9 and vice versa. The direction is controlled by the signal on line 5 which is called the U/D signal. The difference in count between the counts in counters 11 and 12 represents the digital value "*n*". The digital value "*n*" also determines the phase displacement of the counter output signals on lines 51 and 52 with respect to the signals on lines 54 and 55, respectively.

The total range of counts for "*n*" is equal to N where N is typically 2,000 or 10,000. The counters 11 and 12 together with control and generation means 7 divide the clock pulses on line 20 by a factor representing N. With clock 21 having a frequency NF, a division by N produces phase-shifted control signals of frequency F on lines 51, 52, 54 and 55. With the improvements of the above-referenced application Ser. No. 112,994, a clock of frequency NF/2 may be employed to obtain those control signals of frequency F.

The sine and cosine drive signals in windings 46 and 44, respectively, are produced as a function of the digital count "n", the count range N, and the frequency F. The pulse-width modulated signals applied through windings 44 and 46 have pulse widths which are functions of [2 "n"/N] [1/F]. A one-bit change in the digital count "*n*" changes the pulse widths of the current in the windings 44 and 46 an amount equal to [2/N] [1/F].

Each input pulse on line 6 represents an incremental unit of measure 1/N within the space cycle of the transducer 42 where that space cycle is divided into N parts. The converter comprised of the control and generation means 7, the first and second counters 11 and 12, the logical combining and power drive means 17 functions to store the digital value "*n*" representing a particular incremental value between 0 and N-1. Each digital input on line 6 represents a one out of N change in the space position, that is, a one bit change in "*n*".

Further details as to the general operation and structure of the control and generation means 7 in combination with the first and second counters 11 and 12 may be had by referring to the above-referenced application Ser. No. 112,994.

Referring still to FIG. 1, counter 11 includes a first conventional counter 101 which divides the input signal on line 102 by a quantity, for example 250. The output from counter 101 is connected to a conventional divide-by-two stage 104 and through a conventional inverter 103 to another conventional divide-by-two stage 105. The outputs on lines 51 and 52 from the divide-by-two stages 104 and 105, respectively, are of frequency F and serve as two inputs to the logical combining and power drive means 17.

In a similar manner, the second counter 12 includes a conventional counter 101′, dividing by the same value as stage 101, has its output 53 connected to a conventional divide-by-two stage 104′ and through an inverter 103′ to another conventional divide-by-two stage 105′. The output lines 54 and 55 from the divide-by-two stages 104′ and 105′, respectively, also have a frequency F and serve as inputs to the logical combining and power drive means 17.

Logical combining and power drive means 17 includes a conventional NAND gate 110 which receives the phase-shifted control signals as inputs on line 52 and 55 from counters 11 and 12, respectively. The output from NAND gate 110 is connected as the input to a conventional NAND gate 111 and to a drive circuit 130. In a similar manner, NAND gate 114 receives the phase-shifted control signals as inputs from lines 51 and 54 from the first and second counters 11 and 12, respectively. NAND gate 114 has its output on line 59 connected as an input to conventional NAND gate 115 and to drive circuit 133.

OR gate 118 receives inputs from lines 52 and 55 from first and second counters 11 and 12, respectively. The output from OR gate 118 on line 57 is connected to NAND gate 111 and to drive circuit 132. In a similar manner, OR gate 119 receives inputs from lines 51 and 54 from first and second counters 11 and 12, respectively. The output from OR gate 119 on line 60 connects as an input to NAND gate 115 and drive circuit 135.

NAND gate 111, receiving inputs from lines 56 and 57 as previously described, has an output on line 58 which connects to the drive circuit 131. In a similar manner, NAND gate 115, having inputs from lines 59 and 60 as previously described, has an output on line 61 which connects to drive circuit 134. Each of the drive circuits 130 through 135 has an input from the power source line 138 connected to a power source 124. Each of the drive circuits will be described hereinafter in connection with FIG. 3.

The output from drive circuit 130 on line 162 connects through terminal 62 and resistor 168 to terminal 170 of cosine winding 44 of position-measuring transformer 42. Similarly, drive circuit 132 on output line 164 connects through terminal 64 and resistor 169 to terminal 171 of cosine winding 44.

Drive circuit 131 connects through output line 173 to ground through resistor 174. Resistor 174 functions as a alternate load while cosine winding 44 serves as the principal load.

Output line 163 from drive circuit 133 connects through terminal 63 and resistor 177 to terminal 178 of sine winding 46. Similarly, output line 165 from drive circuit 135 connects through terminal 65 and resistor 179 to terminal 180 of sine winding 46.

Drive circuit 134 connects through output line 182 and resistor 183 to ground. Resistor 183 functions as an alternate load while sine winding 46 functions as the principal load.

Resistors 168, 169, 177 and 179 are typically 15 ohms and function to assure that the impedance seen by power source 124 is substantially constant even for small variations in impedance in the drive circuits 130 through 135 or the sine and cosine windings 46 and 44. In the drive circuit embodiment of FIG. 7 described hereinafter, the resistors 168, 169, 177 and 179 are eliminated since their equivalent is included within the drive circuit per se.

Figure 2:
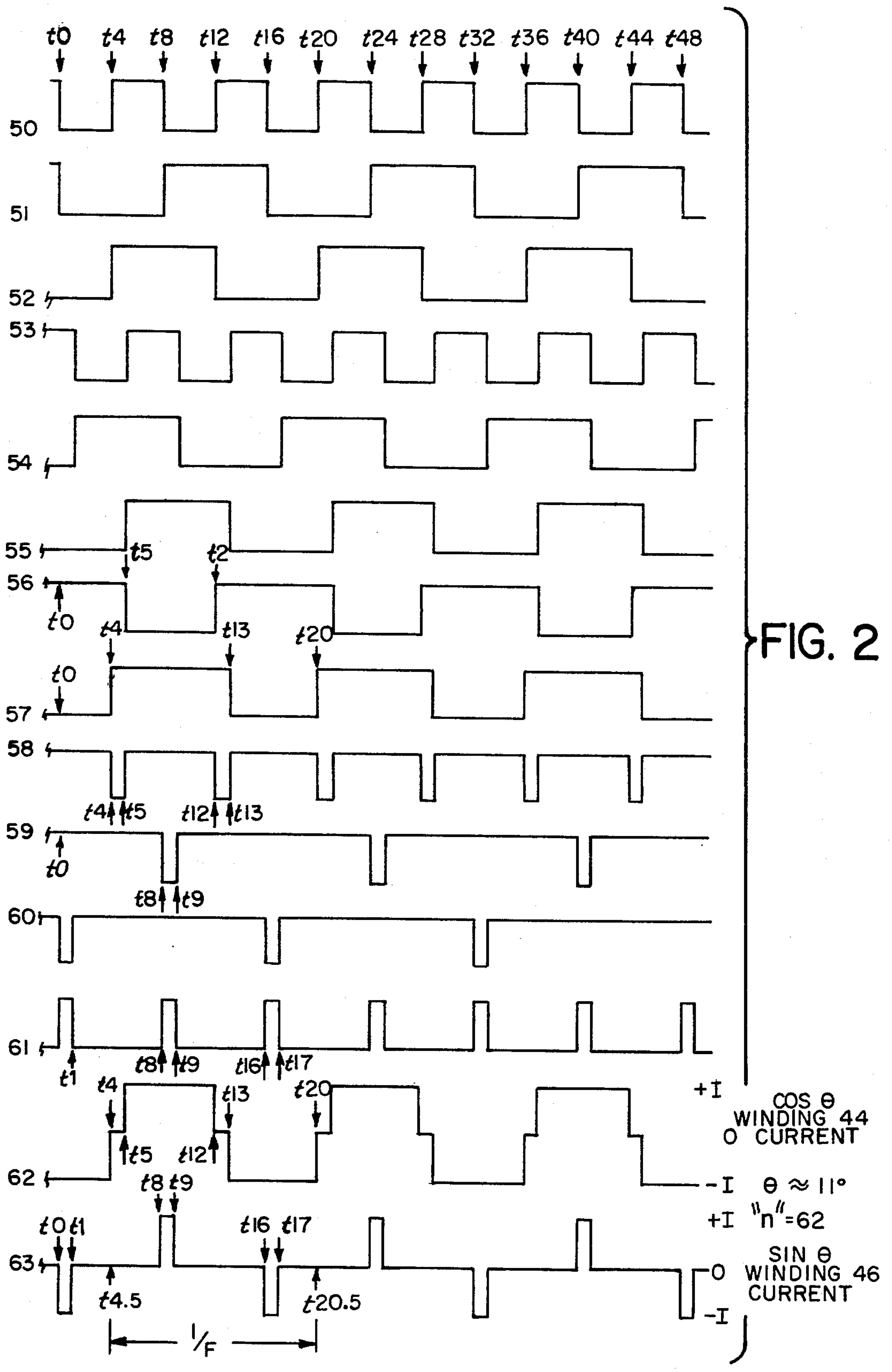
FIG. 2 depicts waveforms representative of the operation of the FIG. 1 apparatus.

Referring to FIG. 2, waveforms representing the operation of the FIG. 1 apparatus are shown. The number identification along the left-hand margin of FIG. 2 corresponds with the number of the line or terminal in FIG. 1 to which it corresponds.

Figures 3, 4:
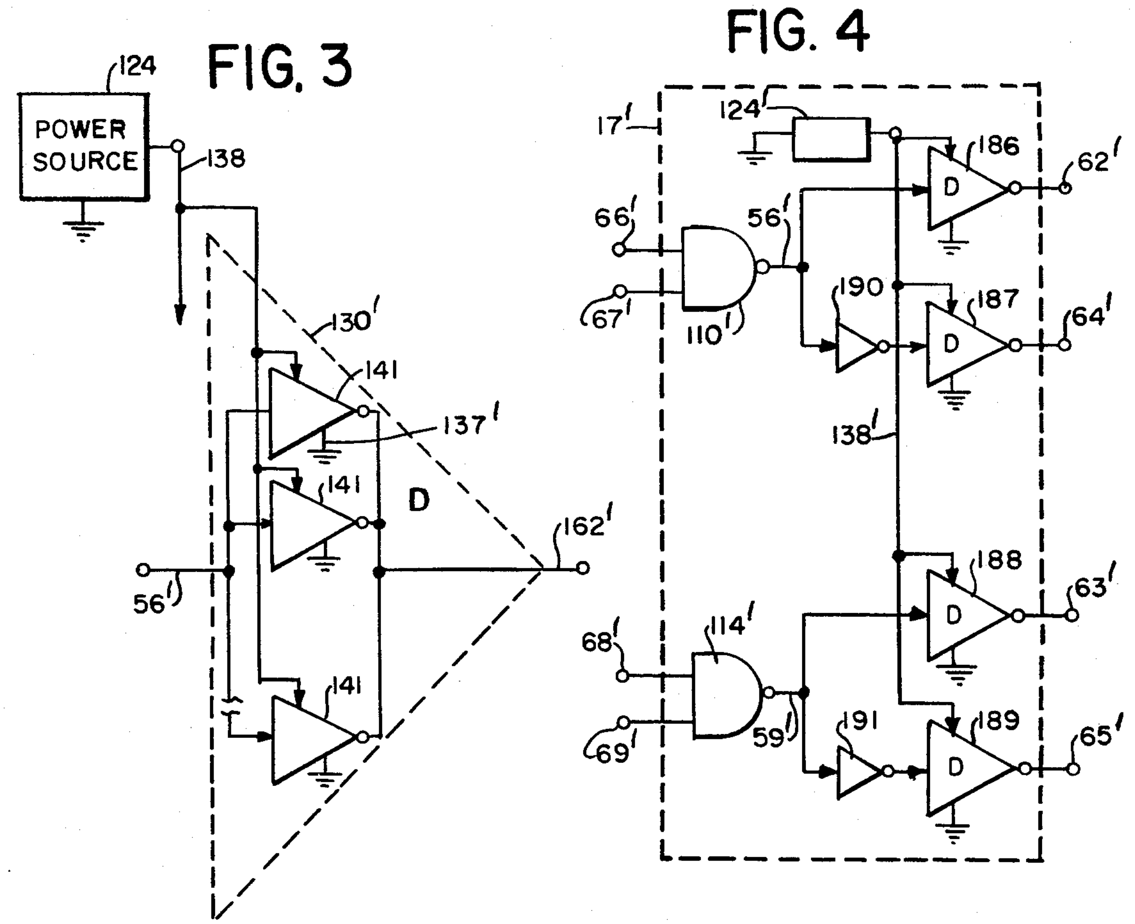
FIG. 3 depicts a schematic, electrical diagram of a typical drive circuit, employed in the FIG. 1 apparatus including its connection to a power supply.
FIG. 4 depicts an alternate drive circuit arrangement which may be employed in the apparatus of FIG. 1.

Referring to FIG. 3, a drive circuit 130′ typical of the drive circuits 130 through 135 of FIG. 1 is shown. Drive circuit 130′ includes an input on line 138 from power source 124 to each of the coventional INVERTER gates 141. Similarly, each of the INVERTER gates 141 receives an input from line 56′ and develops a common output on line 162′. INVERTER gates 141 are typically like those marketed by Texas Instruments and specified as circuit type SN74HO4.

Figure 7:
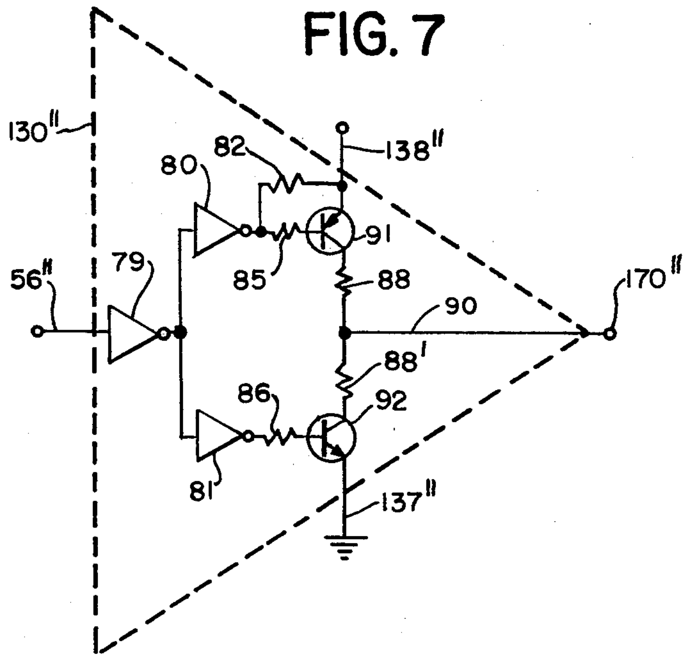
FIG. 7 depicts another drive circuit for use with the FIG. 1 and FIG. 4 configurations.

An alternate drive circuit typical of the drive circuits 130 through 135 of FIG. 1 is shown as drive circuit 130″ in FIG. 7. Input line 56″ and output terminal 170″ of FIG. 7 correspond to the locations with the same but unprimed numerals in FIG. 1. Referring to FIG. 7, input line 56″ connects through INVERTER gate 79 to inverter gates 80 and 81. INVERTER gates 79 and 81 are conventional gates which are typically those marketed by Texas Instruments and specified as circuit type SN74HO4. Gate 80 is also conventional and is typically a Texas Instruments circuit type SN74HO5. The output of INVERTER gate 80 connects to a pull-up resistor 82 (e.g. 390 ohms) and a resistor 85 (e.g. 330 ohms). Resistor 85 connects in turn to the base input of transistor 91 which is typically a type 2N4036 PNP transistor. Pull-up resistor 82 connects to the power supply line 138″. Line 138″ is analogous to power supply line 138 of FIG. 1. The output of INVERTER gate 81 connects to resistor 86 (e.g. 270 ohms). Resistor 86 in turn connects to the input base of transistor 92 which is typically a type 2N2102 NPN transistor.

Transistor 91 has its emitter connected to the power supply line 138″ and its collector connected to resistor 88 (e.g. 15 ohms) which is in turn connected to the output line 90 which connects to terminal 170″. In a similar manner, transistor 92 has its emitter connected to ground line 137″ and its collector connected to resistor 88′ (e.g. 15 ohms) which is in turn connected to output line 90 and terminal 170″.

Resistors 88 and 88′ in FIG. 7 are equivalent to resistor 168 in FIG. 1 and hence output line 90 of FIG. 7 is designed to connect directly to terminal 170 of FIG. 1 so that resistor 168 is not employed with the FIG. 7 drive circuit.

Drive circuit 130″ is selectively energizable in first and second conduction states. The particular one of the two conduction states of drive circuit 130″ which is selected is controlled by the signal level on line 56″. When the signal on line 56″ is high, the output signal from INVERTER gate 79 is low and the output from INVERTER gates 80 and 81 are high. Those high levels from gates 80 and 81 are applied through resistors 85 and 86, respectively, to the bases of transistors 91 and 92, respectively. The base-emitter of transistor 91 is therefore biased off, thereby forcing transistor 91 off. Because transistor 92 is of the opposite conduction type (NPN) from that of transistor 91 (PNP), the base-emitter of transistor 92 is biased on thereby forcing transistor 92 on. With transistor 92 on and with transistor 91 off as occurs when line 56″ is high, the output line 90 is effectively connected through resistor 88′ and the collector-emitter of transistor 92 to the low level (ground) on line 137″. This connection of terminal point 170″ to the low level of line 137″ is defined as the first conduction state of drive circuit 130″. In this first conduction state, terminal 170″ is connected to act as a "sink".

With input line 56″ low, the output from gate 79 is high and the outputs from gates 80 and 81 are low so that low signal levels are applied through resistors 85 and 86 to the base inputs of transistors 91 and 92, respectively. With a low input to transistor 91, the base-emitter bias forces transistor 91 on. At the same time, the base-emitter bias of transistor 92 forces transistor 92 off. In this condition with transistor 91 on and transistor 92 off, terminal 170″ is effectively connected through resistor 88 and th collector-emitter of transistor 91 to the high level (+V) of line 138″. The connection of terminal 170″ to the high level of line 138″ is defined as the second conduction state of drive circuit 130″. In this second conduction state, terminal 170″ is connected as a "source".

When line 56″ is high and terminal 170″ is effectively connected to the low level of line 137″, resistor 88′ of FIG. 7 carries out the function of resistor 168 in FIG. 1. Similarly, when line 56″ is low and terminal 170″ is effectively connected to the high level of line 138″, resistor 88 of FIG. 7 carries out the function of resistor 168 of FIG. 1.

The power source 124 may be of any conventional design for supplying the INVERTER gates 141 of FIG. 2 or the transistor 91 of FIG. 7. Typically, power source 124 is a constant voltage supply for supplying the required voltage, +V. In the case of the SN74HO4 inverters of FIG. 3, +V is the Vcc of +5 volts. In the case of drive circuit 130″ of FIG. 7, gate 80 may be selected to allow higher voltages on line 138″ and hence higher power to the load. For example, for up to 30 volts, gate 80 may be typically a Texas Instruments SN7406 inverter gate. The drive circuit 130′ of FIG. 3 or 130″ of FIG. 7 are also typical of the drive circuits 186 through 189 in FIG. 4.

Referring to FIG. 4, an alternate embodiment of the power drive and logical combining means 17 of FIG. 1 is shown. The drive means 17′ directly replaces drive means 17 of FIG. 1, and the primed numerals of FIG. 4 correspond with the unprimed numerals of FIG. 1.

The inputs 66′ and 67′ connect to a conventional NAND gate 110′, which provides an output on line 56′. Line 56′ connects directly to the drive circuit 186 and connects through inverter 190 to the drive circuit 187.

In a similar manner, input terminals 68′ and 69′ connect to the conventional NAND gate 114′ to produce an output on line 59′. Line 59′ connects directly to the drive circuit 188 and through inverter 191 to the drive circuit 189. Drive circuits 186 through 189 produce the outputs at terminals 62′, 64′, 63′, and 65′, respectively.

Figure 5:
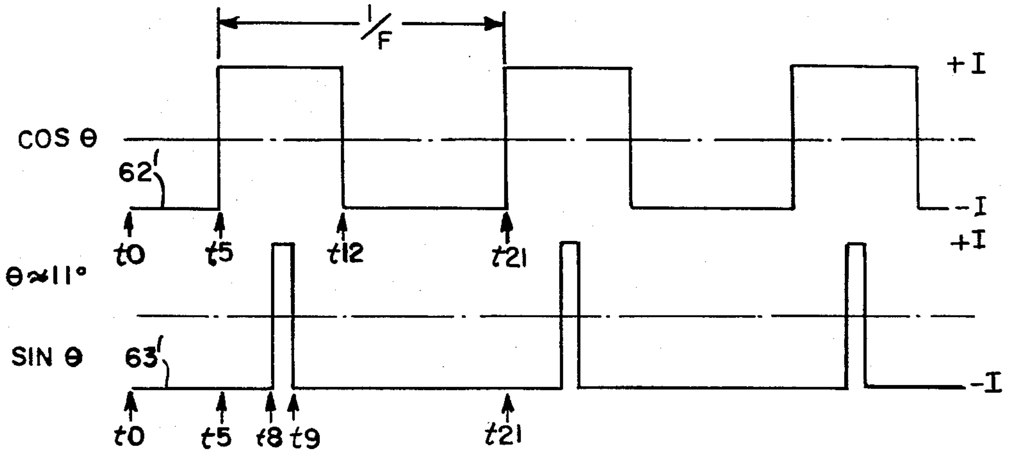
FIG. 5 depicts waveforms representative of the operation of the FIG. 4 drive circuit arrangement used in the FIG. 1 apparatus.

Referring to FIG. 5, waveforms 62′ and 63′ are representative of the signals at those terminals in FIG. 4. Waveforms 62′ and 63′ of FIG. 5 are analogous to the waveforms 62 and 63 of FIG. 2.

Figure 6:
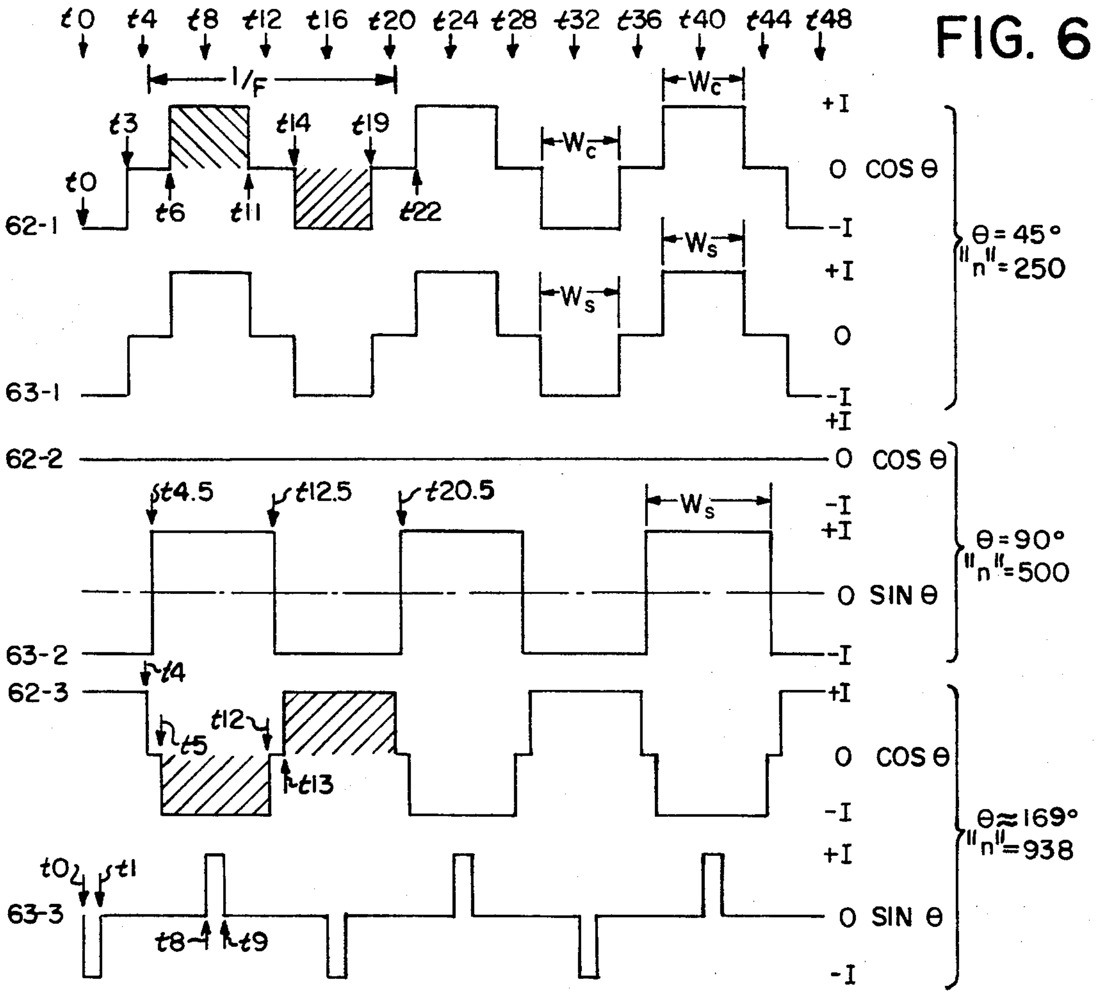
FIG. 6 depicts further waveforms representative of the FIG. 1 apparatus.

FIG. 6 depicts further waveforms descriptive of the operation of FIG. 1 embodiment.

OPERATION

The FIG. 1 apparatus operates to produce pulse-width modulated drive signal currents in the cosine winding 44 and in the sine winding 46 in order to produce a signal between output terminals 77 and 78 of the scale member 40. That output signal from scale 40 is a function of the input drive signals from logical combining and drive means 17 to windings 44 and 46, as well as of the relative space position of windings 44 and 46 relative to scale winding 40. Operations of transducers like transducers 42 are well known.

The space cycle of transducer 42 is typically a small unit of measure such as 2 mm. or 0.2 inch for linear or 1 degree for rotary measure. Further, each cycle is further divided electrically into a number, N, of parts. For decimal systems, N is typically 2,000 or 10,000 parts. The converter of FIG. 1, represented by elements 7, 11, 12, and 17, functions to accumulate and store a digital value "*n*" representing some one of those N parts. Depending on the value of "*n*", the amplitude of the fundamental frequency component in both the cosine winding 44 and the sine winding 46 is varied. The variance in amplitude of the fundamental frequency component is proportional to cosine $\theta$ as it appears in the current drive signal of cosine winding 44 and sine $\theta$ as it appears in the current drive signal of sine winding 46 where $\theta$ is the electrical angle equal to ("*n*"/N) 360°.

SYMMETRICAL EMBODIMENT OF FIG. 1

Referring to FIG. 2, typical waveforms for the FIG. 1 apparatus are shown, for a value of "*n*" equal to 62 where N equals 2,000, and therefore $\theta$ equals approximately 11°.

In FIG. 2, waveforms 62 and 63 are representations of the drive signal currents through terminal points 62 and 63 and the cosine and sine windings 44 and 46, respectively. By way of contrast, the other waveforms of FIG. 2 are descriptive of the voltage levels at the respective points.

The phase shift produced in the output signals from the first and second counters 11 and 12 for a value of "*n*" equal to 62 is observed by comparing the phase of waveform 52 with waveform 55 and waveform 51 with waveform 54. The waveforms 52 and 55 and 51 and 54, for N equal to 2,000, can have a phase shift from 1 to 1,000 time units. Because a scale of 1,000 cannot be readily observed in the drawings, a time scale of 16 units per cycle has been arbitrarily used and the switching times hereinafter referred to have been rounded to the closest one-half unit of *t*. The phase shift between waveform 52 and waveform 55 is detected in NAND gate 110 to produce waveform 56, which controls the conduction state of drive circuit 130. More specifically, at time *t*4, waveform 52 goes high, so that thereafter, at time *t*5, when waveform 55 goes high, waveform 56 is caused to go low. Drive circuit 130 is a bistate device which has an output on line 162 which is the inversion of the level on line 56. When the input on line 56 is low, drive circuit 130 is in a high conduction state; when the input on line 56 is high, drive circuit 130 is in the low conduction state. In a similar manner, drive circuits 131 through 135 are in high or low conduction states in inverse relation to their inputs on lines 58, 57, 59, 61, and 60, respectively.

At time t0 through t3, waveform 56 is high, causing line 162 to be low, and line 57 is low, causing line 164 to be high. With line 164 high and line 162 low, a current is conducted through cosine winding 44 in the minus direction. At time t4, waveform 56 is still high, and waveform 57 switches high, so that between t4 and t5 both lines 162 and 164 are high, since drive circuits 130 and 132 are both high, that is, both in the same conduction state. With lines 162 and 164 being in the same conduction states, no current exists through the cosine winding 44. At time *t*5, waveform 56 goes low while waveform 57 remains high. From time *t*5 to t12, line 162 is high and line 164 is low, causing current to be conducted in cosine winding 44 in the positive direction. During this period, drive circuit 130 is in the opposite conduction state of drive circuit 132.

At time *t*12, waveform 56 again goes high, causing drive circuit 130 to be in the same low state as drive circuit 132. At time t13, waveform 57 goes low, causing drive circuit 132 and line 164 to go high, that is, to go to the opposite state of drive circuit 130 and line 162. From time *t*13 to time *t*20, current is conducted through cosine winding 44 in the minus direction.

In summary of the above description, whenever drive circuits 130 and 132 are in the same conduction states, no current is conducted in cosine winding 44, and whenever they are in opposite conduction states, a current occurs in winding 44. If drive circuit 130 is high and drive circuit 132 is the opposite low conduction state, then current in winding 44 is positive, by definition. If drive circuit 132 is high and drive circuit 130 is in the opposite low conduction state, then current conduction through winding 44 is defined to be negative.

Referring to waveform 62, cosine winding 44 has a negative current from time *t*0 until time *t*4. From time t4 to *t*5, the current is zero. From time *t*5 until time *t*12, the current is positive. From time *t*12 to *t*13, the current is again zero. From time *t*13 until time *t*20, the current is again negative. The period from *t*4.5 until *t*20.5 defines one electrical cycle 1/F. During that electrical cycle, the drive circuits 130 and 132 are in the same conduction states for periods from *t*4.5 to *t*5, from *t*12 to *t*13 and from *t*20 to *t*20.5. For the duration from t5 to t12, a positive current of constant magnitude, I, results because the drive circuits 130 and 132 are in opposite conduction states (with circuit 130 high and circuit 132 low). For the duration from t13 to t20, a negative current of the same constant magnitude results because drive circuits 130 and 132 are in second opposite states (with circuit 132 high and circuit 130 low).

Waveform 63 depicts the current through terminal 63 and therefore the current through sine winding 46. The current in sine winding 46, in a manner analogous to the current in cosine winding 44, is controlled by the conduction states of the drive circuits 133 and 135. When drive circuits 133 and 135 are in the same conduction state (both high or both low), no current is conducted in sine winding 46. When drive circuits 133 and 135 are in opposite conduction states, a current of constant amplitude, I, conducts in either the positive or negative direction. In a first opposite state, with drive circuit 133 high and drive circuit 135 low, the direction is positive. In second opposite conduction states, with circuit 135 high and circuit 133 low, the conduction direction is negative. The conduction states of drive circuits 133 and 135 are controlled by the signal levels on lines 59 and 60 in a manner analogous to the control of the conduction states of drive circuits 130 and 132 by signal levels on lines 56 and 57.

Specifically, referring to waveform 63 for the cycle period *t*4.5 to *t*20.5, a positive current of constant magnitude, I, occurs between the times *t*8 and *t*9, and a negative current of constant amplitude, I, occurs between the times *t*16 and *t*17.

As is apparent from observing waveforms 62 and 63, certain periods (e.g. *t*12 to *t*13 for waveform 62) over each cycle may result in an absence of current through the sine and cosine windings 46 and 44 while others may require full current. Since the transition from full current to zero current and vice versa may result in fluctuations in the current actually supplied by power source 124 in FIG. 1, the alternate drive circuits 131 and 134 and the alternate loads 174 and 183 are provided to insure that the current supplied by power source 124 does not vary.

The alternate load 174 for the cosine winding 44 conducts a constant amplitude current, I, whenever the waveform 58 is low. Waveform 58 is low whenever waveforms 56 and 57 are high. Specifically, waveform 58 is low from $t4.5$ to $t5$, from $t12$ to $t13$ and from $t20$ to $t20.5$ during the cycle from $t4.5$ to $t20.5$. As is noted by comparing waveform 58 with waveform 62, alternate load 174 conducts a current of constant amplitude, I, whenever, and only whenever, current is not being conducted through the cosine winding 44.

By way of summary, a current of substantially constant amplitude is continuously conducted from power source 124 along line 138. That constant magnitude current is at times conducted through drive circuit 130 as the source, through cosine winding 44 in one direction and through drive circuit 132 as the sink, all of which occurs when drive circuits 130 and 132 are in first opposite states (with circuit 132 low and circuit 130 high). At other times, the same magnitude current is conducted along line 138 through drive circuit 132 as the source, through cosine winding 44 in the opposite direction, and through drive circuit 130 as the sink all of which occurs when drive circuits 130 and 132 are in second opposite conduction states (with circuit 132 high and 130 low). At still other times, the same constant current is conducted only through the drive circuit 131 as the source to alternate load 174 and ground. In the manner described, power source 124 always supplies to the drive circuits 130 through 132 a constant magnitude current, I, without substantial variation, while the direction in and load to which that constant current is supplied is controlled by the drive circuits 130 through 132 and their logical inputs.

Alternate drive circuit 134 drives a current of constant amplitude, I, through alternate load 183 under the control of the signal on line 61 in a manner analogous to the manner in which drive circuit 131 controls the conduction through alternate load 174. Specifically, drive circuit 134 is high and acts as a source to conduct through load 183 whenever the waveform 61 of FIG. 2 is low. During the cycle from $t4$ to $t20$, alternate load 183 is continuously conducting except during the first duration from $t8$ to $t9$, when drive circuits 133 and 135 are in a first opposite state (circuit 133 high and circuit 135 low), and except during a second duration from $t16$ to $t17$, when drive circuits 133 and 135 are in second opposite states (circuit 133 low and circuit 135 high).

In the manner described, power source 124 always supplies to the drive circuits 133 through 135 a constant magnitude current, I, without variation, while the direction in and load to which that constant current is supplied is controlled by the drive circuits 133 through 135 and their logical inputs.

ASYMMETRICAL EMBODIMENT OF FIG. 4

The operation of the FIG. 4 embodiment is described in connection with the waveforms 62′ and 63′ of FIG. 5 where the waveforms 52, 51, 55, and 54 of FIG. 2 represent the inputs to terminals 66′, 67′, 68′, and 69′, respectively, of FIG. 4. The waveforms 62′ and 63′ of FIG. 5 are representative of the drive signal currents through terminals 62′ and 63′ of FIG. 4 when the sine and cosine windings 46 and 44 of FIG. 1 are properly connected as loads in the manner previously described for the substitution of the logical combining and drive means 17′ into the FIG. 1 apparatus. Referring to FIGS. 2 and 5, waveform 56 is representative of the signal on line 56′ of FIG. 4. From time $t4$ to time $t5$, waveform 56 is high, causing the output of drive circuit 186 to be low, as shown by the low condition of waveform 62′ between $t0$ and $t5$. At time $t5$, waveform 56 goes low, causing drive circuit 186 to be high. Because of the inverter 190, drive circuit 187 has an output at terminal 64′ which is always the opposite level of the signal at terminal 62′. Accordingly, with drive circuit 186 low from $t0$ to $t5$, drive circuit 187 is high from $t0$ to $t5$. With drive circuit 187 high and drive circuit 186 low, a negative current is driven through cosine winding 44. At time $t5$, when drive circuit 186 switches from low to high, drive circuit 187 simultaneously switches from high to low. With drive circuit 186 high and drive circuit 187 low, as occurs between $t5$ and $t12$, a positive current is driven through the cosine winding 44. At time $t12$, waveform 56 again goes high, causing drive circuit 186 to be low and drive circuit 187 to be high. For the duration from $t12$ to $t21$, a negative current is again conducted through the load.

For the electrical cycle 1/F from $t5$ to $t21$, (any 16 unit cycle may be observed), the current in the cosine winding 44 is positive with amplitude, I, for the first duration, $t5$ to $t12$, and is negative with amplitude, I, for the second duration, $t12$ to $t21$. Note that, in connection with the 1/F cycle, the current is always +I or −I, and never 0. In terms of the current supplied by the power source 124′ of FIG. 4, a constant current of amplitude, I, is conducted in line 138′ in connection with the cosine winding 44. That current I is at times conducted from line 138′ through drive circuit 186 and cosine winding 44 to the drive circuit 187. At other times, that current I on line 138′ is conducted through drive circuit 187 and the cosine winding 44 to the drive circuit 186.

Because current of constant magnitude, I, is continuously drawn from power source 124′, no variation in current is required from power source 124′. The direction through the load of the current I is changed, but the magnitude of that current is not.

In a similar manner, drive circuits 188 and 189 for driving the sine winding 46 of FIG. 1 are always in opposite conduction states. The conduction states of drive circuits 188 and 189 are controlled by the signal on line 59′ as represented by waveform 59 in FIG. 2. Waveform 59 is high for the period $t0$ to $t8$, thereby causing drive circuit 188 to below and drive circuit 189 to be high. With drive circuit 188 low and drive circuit 189 high, a current through the cosine winding 46 is negative and of an amplitude, I. At time $t8$, waveform 59 goes negative, causing the conduction states of drive circuits 188 and 189 to change, although they are still in opposite conduction states. For the period between t8 and t9, with drive circuit 188 high and drive circuit 189 low, a positive current of amplitude, I, is conducted through the sine winding 46 connected between terminals 63′ and 65′. Again, at $t9$, the drive circuits 188 and 189 switch back to the first opposite conduction states with drive circuit 188 low and drive circuit 189 high. During a full electrical cycle 1/F, for example, between $t5$ and $t21$, the current through sine winding 46 is always of amplitude, I, with either a positive or a negative sign. Note that the current is never of zero amplitude for the embodiment of FIG. 4.

In a manner similar to the cosine winding 44, the sine winding 46 does not cause a fluctuation in the current on on line 138′ from power source 124′. The same maximum current, I, is continuously supplied by line 138′ to the drive circuits 188 and 189. At times, current is conducted through drive circuit 188 and the sine winding 46 to drive circuit 189. At other times, the current is conducted through drive circuit 189 and sine winding 46 to drive circuit 188.

Since both the sine and cosine drive circuits of the FIG. 4 apparatus always require a substantially constant, non-varying current from the power source 124', cross coupling between the sine and cosine drive signals is avoided.

PULSE WIDTH MODULATION

The waveforms previously described in connection with FIGS. 2 and 5 represented a single value of "*n*"0 and therefore a single value of $\theta$; that is, $\theta$ equal to approximately 11 degrees. The waveforms of FIG. 6 depict values of $\theta$ equal to 45°, 90°, and approximately 169°. The waveforms 62-1 and 63-1 represent the current drive signals for the cosine and sine windings, respectively. Note that the cosine drive signal of waveform 62-1 is identical in phase and amplitude to the sine winding drive signal of waveform 63-1. This identity results, of course, because the sine and cosine functions of 45° are equal. Note that, for the cycle from *t*4.5 to *t*20.5, the cosine current is a constant amplitude, +I, for the first duration, from t6 to t11, and is a negative constant amplitude, −I, for the second duration, from *t*14 to *t*19. During the periods from *t*4.5 to *t*6, *t*11 to *t*14, and *t*19 to *t*20.5, the current in the cosine winding is zero. The total period over one cycle for which zero current exists in the cosine winding is given by 1/F minus the first duration (*t*6 to *t*11) and minus the second duration (*t*14 to *t*19). In accordance with the operation of the FIG. 1 apparatus as previously described, the alternate load conducts a current I during those non-conducting periods (*t*4.5 to *t*6, *t*11 to *t*14, *t*19 to *t*20.5) of the cosine winding.

Waveforms 62-2 and 63-2 represent the cosine and sine drive signals for $\theta$ equal to 90°. Note that the cosine signal is continuously of zero amplitude, so that, in terms of the FIG. 1 apparatus, the alternate load 17 under these conditions is always conducting. The sine signal of waveform 63-2 indicates that the sine winding is continuously conducting 50 percent in one direction and 50 percent in the other direction over each cycle. Accordingly, the alternate load 183 under these conditions conducts no current over each cycle.

Waveforms 62-3 and 63-3 depict the cosine and sine drive signals for $\theta$ equal to approximately 169°. Comparing the waveforms of FIG. 2, where $\theta$ equals approximately 11° to the waveforms of FIG. 6, where $\theta$ equals approximately 169°, note the reversal in sign of the current in the cosine winding. More particularly, the sine of 11° and the sine of 169° are of the same sign and amplitude, as is evident by the identity of the positive current between *t*8 and *t*9 for both waveform 63 and waveform 63-3. The cosines of 11° and 169° are of the same magnitude but of opposite sign. Note that the amplitude for waveform 62 between *t*5 and *t*12 is positive, whereas the amplitude for waveform 62-3 between t5 and t12 is negative.

DRIVE SIGNAL SPECTRUM ANALYSIS

As previously indicated, the embodiment of FIG. 1 bilaterally drives the cosine winding 44 and sine winding 46 with the symmetrical waveform of FIGS. 2 and 6. Referring to FIG. 6, for example, the waveform 62-1 over the period from *t*4.5 to *t*20.5 includes a drive current +I from *t*6 to *t*11 which is centered at *t*8.5. In a similar manner, the drive current −I in the opposite direction occurs between t14 and *t*19 and is centered at t16.5. The center of the −I current is exactly 180° away (eight units of *t*) from the center of the +I current. Note that the cross-hatched areas of waveform 62-1 are equal. This 180° negative symmetry over each cycle gives rise to the presence of only odd harmonics in the frequency spectrum of the drive signals of the FIG. 1 apparatus. More specifically, it can be shown by Fourier analysis that the drive current, *i*(*wt*) in either the cosine winding 44 or the sine winding 46 is given by the following equation:

$$i(wt) = \sum_{m}^{\infty} \frac{4I}{m\pi} [\sin my]\ [\sin mwt] \qquad \text{Eq. (1)}$$

Where:

I = Constant current amplitude $y$ = one-half of the pulse width of the drive signal in radians where $0 \leq y \leq \pi/2$ m = 1, 3, 5, 7, ...

sin $my$ = amplitude of harmonic frequency term sin $mwt$ = harmonic frequency term In the above expression, the half-pulse width, *y*, is a function of the digital count "*n*" and the number of divisions N both as determined by the converter of FIG. 1 as previously discussed. More specifically, the pulse widths, $W_c$ and $W_s$, of the cosine and sine drive signals (see FIG. 6). are given by the following equations:

$$W_c = \left[\frac{|N/2 - [2\text{“}n\text{”} \text{ Mod } N]|}{N}\right]\left[\frac{2\pi}{F}\right] \qquad \text{Eq. (2)}$$

$$W_s = \pi - W_c \qquad (3)$$

Where:

N = the number of divisions of the transducer cycle

"n" = accumulated converter count

F = fundamental frequency

Using Eqs. 2 and 3, the value of y in Eq. 1 for the cosine drive signal is $y = W_c/2$ and for the sine drive signal is $y = W_s/2$. For example, referring to the cosine waveform 62-1 of FIG. 6, the pulse width $W_c$ is 5$\pi$/8, since the waveform has the value +I for the five units from +6 to +11 out of the total possible eight units from *t*4.5 to *t*12.5. Since $W_c$ is $5\pi/8$, the value of *y* in Eq. (1) is $5\pi/16$. In a similar manner, in waveform 62-2, $W_c$ equals 0 and *y* equals $\pi/2$.

Referring now to the FIG. 5 waveforms representative of the assymetrical bilateral drive circuit of FIG. 4, the Fourier expression for the drive currents produced by the FIG. 4 circuitry can be shown to include in general both odd and even harmonics.

With the pulse width drive signals of the types described, the signals produced in the scale winding 40 (see FIG. 1) as a result of these drive signals includes the same harmonics that were in the drive signals. The dc term if any in the drive signal is not transmitted from windings 44 and 46 to the scale winding 40 since only transformer coupling exists.

The information signal appearing between terminal 77 and 78, besides being a function of the drive signals from windings 44 and 46, is further modulated by the space relationship of the windings 44 and 46 relative to the winding 40. Since the information signal between terminals 77 and 78 of interest is in general only the fundamental frequency (that is, $m=1$ for Eq. 1), the signal resulting from the highr harmonics (m greater than 1 in Eq. 1 presents extraneous information which if not removed can cause errors. The conventional process for removing such extraneous information presented by the higher odd harmonics is either phase detecting or filtering by well known techniques.

Because the FIG. 1 apparatus as represented by Eq. 1 contains no even harmonics, the phase detection and filtering techniques which are required are simplified compared to those required with the FIG. 4 apparatus. This simplification in the FIG. 1 apparatus results primarily due to the absence of the second harmonic.

While the count N representing the divisions of the transducer cycle has been previously described generally as a decimal number, any numbering system may, of course, be employed. Two systems other than decimal typically employed are binary systems and systems based upon the number 360, the latter for dividing the 360° of a circle into integral parts.

The position-measuring transducers suitable for energization with the drive apparatus and method of the present invention may take many forms. Position-measuring transformers of the type manufactured under the trademark INDUCTOSYN can, of course, be rotary or linear devices. The polyphase windings and the scale winding each may be on a stationary or moving member, the only condition required being that relative movement between the members exist. Additionally, other transducers such as resolvers are, of course, included.

While the invention has been particularly shown and described with reference to preferred embodiments thereof, it will be understood by those skilled in the art that various changes in form and details may be made therein without departing from the spirit and the scope of the invention.

What is claimed is:

1. An apparatus for supplying electrical signals having a cycle 1/F to bilaterally drive a load comprising, a first drive circuit connected to one side of said load and a second drive circuit connected to the other side of said load, each drive circuit selectably energizable in first and second conduction states, a power source connected to conduct current through said device circuits to energize said load, means for selecting said drive circuits in said first conduction states for a first duration of each cycle to produce a substantially constant current for said first duration through said load in one direction and in second conduction states for a second duration of each cycle to produce a substantially constant current for said second duration through said load in the opposite direction, wherein said means for selecting includes means for maintaining said first duration equal to said second duration whereby said signals contain substantially only the odd harmonics of the fundamental frequency F, an alternate load, a third drive circuit selectably energizable in third and fourth conduction states, said third drive circuit coperative to energize said alternate load with the current from said power source when in said third conduction state, logic means for selecting said third drive circuit in said third conduction state when said first and second drive circuits have the same conduction state, said load and said alternate load together drawing a constant current from said power source for the full duration of each cycle.

2. The apparatus of claim 1 wherein said means for selecting includes, means for maintaining said first and second drive circuits in said first and second conduction states for the full duration of each cycle whereby the current supplies by said power source to said load is of substantially constant magnitude and is in one direction through said load when in said first conduction states and is in the other direction through said load when in said second conduction states.

3. The apparatus of Claim 1 wherein said means for selecting includes first and second cyclically stepped counters producing counter output signals having a phase shift, logic means responsive to the phase shift between said counter output signals to control the conduction state of said drive circuits and produce a pulse-width modulation of the current through said load.

4. The apparatus of claim 1 wherein said load comprises sine and cosine windings of a position-measuring transformer on one member, and said transformer having a scale winding on another member, said members relatively movable with respect to each other and said windings electrically coupled to define a space cycle.

5. Transducer drive apparatus comprising, first and second bistate drive circuits, a common power source for said drive circuits, said drive circuits being connected respectively at opposite ends of a primary load consisting of the sine and cosine windings of a position-measuring transformer, means providing control signals, logic gates responsive to said control signals to maintain said drive circuits in first or in second opposite states, a change from first opposite states to second opposite states of said drive circuits changing the direction of current in the load without altering the amount of current supplied from said source to said load, the resultant current drive signal in said load having a pulse-width modulated rectangular form having a modulation resulting from controlling the time at which said drive circuits change back and forth between said first and second opposite states, and an alternate load and drive circuit for each of said windings, whereby each of said windings draws substantially constant power from said power source so that substantially no cross modulation occurs between said sine and cosine windings.

6. An apparatus for supplying electrical signals having a cycle 1/F to bilaterally drive a position-measuring transformer having sine and cosine windings on one member and having a scale winding on another member, said members relatively movable with respect to each other and said windings electrically coupled to define a space cycle, a converter for dividing said space cycle into N parts, said converter being responsive to a stored digital value "*n*", between O and N, to form sine and cosine pulse-width modulated drive signals for energizing said sine and cosine windings, respectively, said signals including fundamental frequency components having an electrical cycle 1/F and having an amplitude proportional to sine $\theta$ and cosine $\theta$, respectively, where $\theta$ equals ("n"/N) 360°, the improvement comprising, a plurality of drive circuits, each selectably energizable in two opposite conduction states, said drive circuits including first and second drive circuits connected, respectively, at opposite ends of the sine winding, and including third and fourth drive circuits connected, respectively, at opposite ends of said cosine winding, a power source connected to said drive circuits for energizing said sine and cosine windings, first logic means for selecting said first and second drive circuits in opposite conduction states for a first duration of each electrical cycle to produce a current through said sine winding in one direction, and for switching the states of said first and second drive circuits to produce a current through said sine winding in the opposite direction for a second duration of each cycle, second logic means for selecting said third and fourth drive circuits in opposite conduction states for a third duration of each electrical cycle to produce a current through said cosine winding in one direction, and for switching the states of said third and fourth drive circuits to produce a current through said cosine winding in the opposite direction for a fourth duration of each cycle, said first logic means including a first alternate NAND gate for receiving the output signals from said first NAND gate and said first OR gate to produce an output to an alternate drive circuit which drives a first alternate load whereby the power output from said power source to said cosine winding and said first alternate load is a constant, said second logic means including second alternate NAND gate for receiving the output signals from said second NAND gate and said second OR gate to produce an output to a second alternate drive circuit which drives a second alternate load whereby the power output from said power source to said sine winding and said alternate load is a constant.

7. The apparatus of claim 6 wherein, said first logic means comprises means for maintaining said first duration and said second duration equal to the full electrical cycle 1/F, said second logic means comprises means for maintaining the sum of said third duration and said fourth duration equal to the full electrical cycle 1/F, whereby the power drawn by said sine winding is a constant and the power drawn by said cosine winding is a constant thereby preventing cross coupling between the sine and cosine drive signals.

8. The apparatus of claim 6 wherein said converter includes first and second counters cyclically stepped through a count range representing N/2, said first and second counters each terminating in two parallel divide-by-two stages where one stage receives the inverted output of the other, said stages for each counter providing a counter output signal and a 90-degree phase-shifted counter output signal, said first logic means connected to receive the 90-degree phase-shifted counter output signals as inputs to a first logical NAND gate and a first logical OR gate for energizing said first and second drive circuits, respectively, making said first duration equal to said second duration and forming the pulse-width modulated cosine drive signal with substantially no even harmonics of the fundamental frequency F, said second logic means connected to receive the counter output signals as input to a second logical NAND gate and a second logical OR gate for energizing said third and fourth drive circuits, respectively, making said third duration equal to said fourth duration and forming the pulse-width modulated sine drive signal having substantially no even harmonics of the fundamental frequency F.

9. The apparatus of claim 6 wherein, said first logic means comprises means for maintaining said first duration equal to said second duration, said second logic means comprises means for maintaining said third duration equal to said fourth duration, whereby the current magnitude and duration in one direction through each of said windings equals the current magnitude and duration in the opposite direction through each of said windings, respectively, thereby providing drive signals with substantially no even harmonics of the fundamental frequency F.

10. The apparatus of claim 9 further including, a first alternate load and drive circuit for conducting current from said power source for the duration 1/F minus said first duration and minus said second duration, a second alternate load and drive circuit for conducting current from said power source for the duration 1/F minus said third duration and minus said fourth duration, whereby the power drawn by said sine winding and said first alternate load is a constant and the power drawn by said cosine winding and said second alternate load is a constant, thereby preventing fluctuations in the output from said power source and preventing cross coupling between the sine and cosine drive signals.

* * * * *